Aug. 27, 1968    H. J. SLADE    3,399,009
ROD CASE
Filed Dec. 22, 1966    2 Sheets-Sheet 1
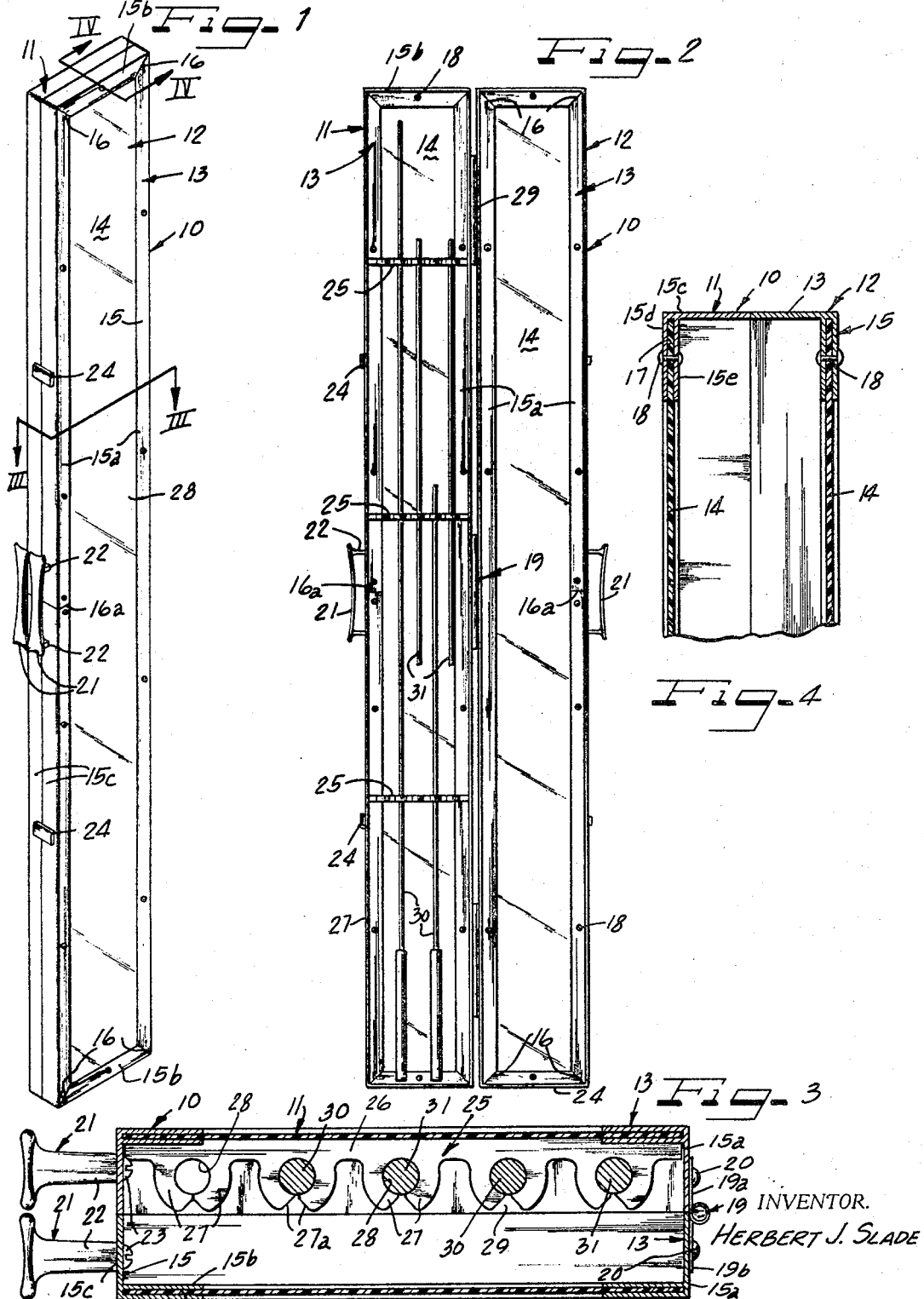
INVENTOR.
HERBERT J. SLADE
BY Hill, Sherman, Meroni, Gross & Simpson ATTORNEYS

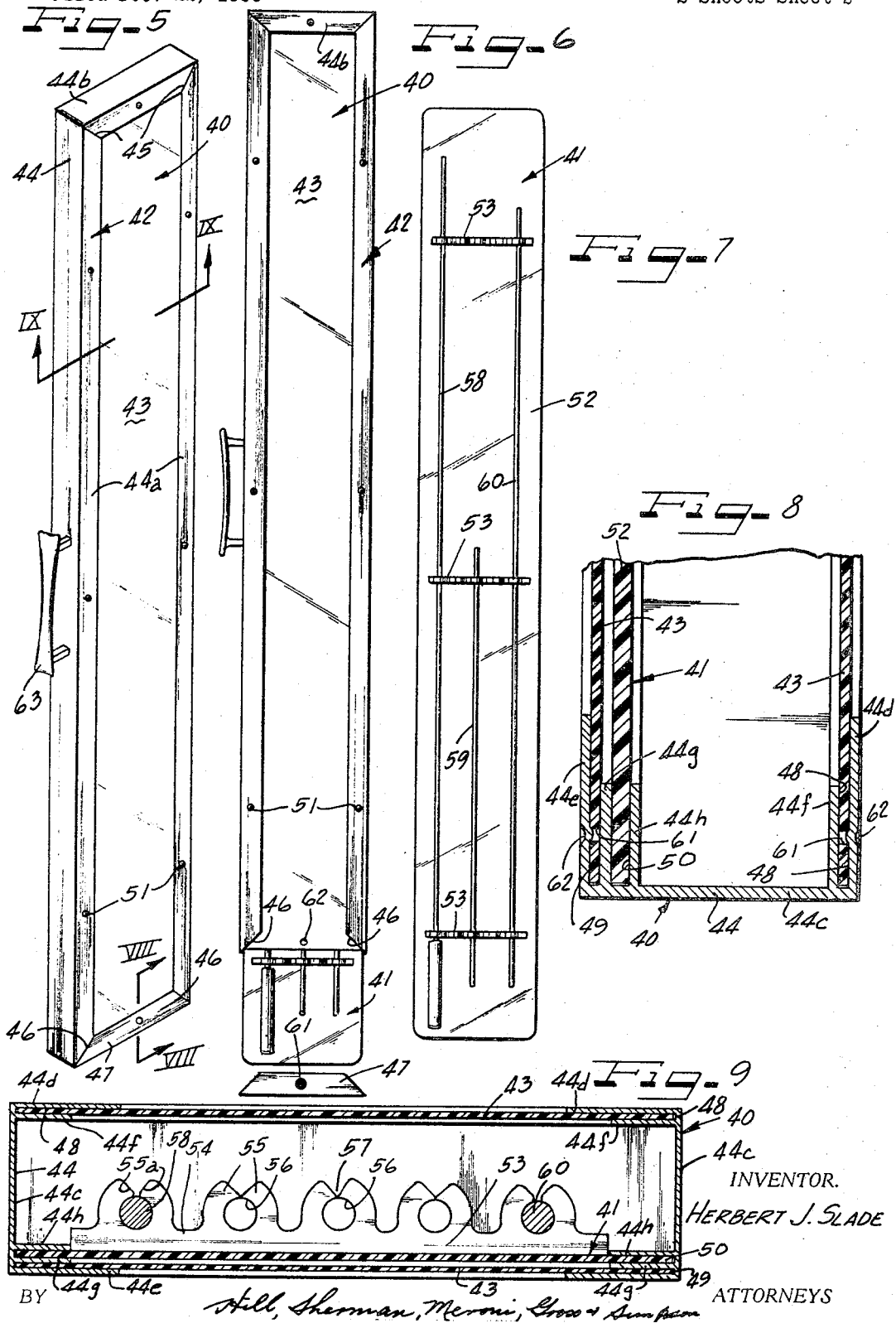

United States Patent Office 3,399,009
Patented Aug. 27, 1968

3,399,009
ROD CASE
Herbert J. Slade, 106 E. Olive St.,
Prospect Heights, Ill. 60070
Filed Dec. 22, 1966, Ser. No. 603,877
7 Claims. (Cl. 312—244)

ABSTRACT OF THE DISCLOSURE

A piece of luggage providing a carrying and display case for compactly holding elongated rod members such as fishing rods, bows and arrows, cues and the like and formed from conventional extruded metal or plastic strips providing a frame and sheet-like panels anchored to the frame. In one embodiment, the case has two hinged together longitudinal sections, one or both of which may be provided with rod retaining fasteners. In a second embodiment, the case is in the form of an end opening sleeve which slidably receives a tray carrying the rods.

BACKGROUND OF THE INVENTION

*Field of the invention.*—The invention provides luggage for safely and compactly carrying elongated rod-like devices such as fishing poles which are easily damaged, bulky to handle, and difficult to protect. The luggage of this invention provides a housing in which a plurality of rod members may be fixedly secured in compact relationship to be protected from each other and to be protected against external damage.

The luggage of this invention is formed from readily available conventional extruded metal strips which provide a strong but lightweight framework. These strips have grooves which receive the marginal edges of rigid plastic sheets such as fiberglass sheets to form the enclosure.

*Description of the prior art.*—Heretofore, carrying cases for fishing rods and the like elongated members have been in the form of flexible sleeves or rigid tubes intended to receive only a single rod. Such prior flexible sleeves have offered no real protection against breakage of the contents and such prior rigid tubes are bulky, hard to handle, and tend to damage the rod on removal or insertion.

The present invention avoids the deficiencies of the prior art in providing a single case for a plurality of rods with each rod individually held and fully protected in position.

SUMMARY

The nature and gist of the invention is a carrying case for rods, formed from conventional extruded metal strips and conventional sheet material carried by the strips to provide an enclosure togetherwith flexible rod mounting grips either in the case itself or on a tray which easily slides in or out of the case.

It is an important object of this invention to provide a lightweight strong carrying case for elongated rods.

Another object of this invention is to provide a carrying and display case for fishing rods and the like which is composed of readily available extruded aluminum strips and fiberglass sheets.

A further object of this invention is to provide a carrying case for fishing rods and the like composed of two hinged together sections, one or both of which are provided with fasteners for snugly and securely engaging the rods.

A still further object of the invention is to provide a carrying case for fishing rods and the like having a sleeve-like body receiving a rod-carrying tray through an end thereof.

Many other objects and features of the invention will be apparent from the following description and appended claims.

BRIEF DESCRIPTION OF THE DRAWING

FIGURE 1 is an isometric view of one form of carrying case of this invention shown in closed position;

FIGURE 2 is a plan view of the case of FIGURE 1 but shown in open position;

FIGURE 3 is an enlarged transverse cross-sectional view taken along the lines III—III of FIGURE 1;

FIGURE 4 is an enlarged fragmentary longitudinal cross-sectional view taken along the lines IV—IV of FIGURE 1;

FIGURE 5 is an isometric view of another embodiment of the carrying case of this invention in its closed position;

FIGURE 6 is a plan view of the case of FIGURE 5 with the end removed and the rod mounting tray partially extended beyond the open end;

FIGURE 7 is a plan view of the tray for the case of FIGURES 5 and 6;

FIGURE 8 is an enlarged fragmentary longitudinal cross-sectional view taken along the lines VIII—VIII of FIGURE 5; and FIGURE 9 is an enlarged transverse cross-sectional view taken along the lines IX—IX of FIGURE 5.

DESCRIPTION OF THE PREFERRED EMBODIMENTS

The case 10 of FIGURES 1 to 4 is composed of two identical hinged together halves 11 and 12 one of which, such as 11, may be considered a main body and the other of which, such as 12, may be considered a cover. Each half 11 and 12 is composed of a rigid rectangular frame 13 and a panel 14 encased in the frame 13.

Each frame 13 is composed of an extruded metal angle strip 15. Each strip 15 is mitered at four spaced points along its length at 16 and bent into a closed loop with ends butted together at 16a to form elongated side legs 15a and short end legs 15b at right angles to the legs 15a. Rectangular frames are thus provided in one piece but it should be understood that the frame 13 could be composed of separate side legs 15a and end legs 15b held together by the panel 14.

As best shown in FIGURES 3 and 4, the strip 15 is an angle with two legs 15c and 15d in right angle relation and with a third leg 15e in spaced parallel relation inwardly from the leg 15d and extending from the leg 15c. The legs 15d and 15e cooperate to provide a groove 17 receiving the peripheral margin of the panel 14 in snug engagement therewith. Rivets such as 18 extended through the legs 15d and 15e and through the inserted margins of the panel 14 secure the panel and frame in fixed relation.

The frame strip 15 is preferably composed of extruded metal such as aluminum although it can also be composed of extruded plastic material of sufficient rigidity to provide a stiff frame. The panel 14 is composed of stiff sheet material such as fiber glass, plastic, metal, plywood or the like. If an exceptionally lightweight case 10 is desired, the frame can be made of extruded magnesium and the panel can be made of lightweight clear or tinted plastic.

The legs 15c and 15d of the strip 15 are illustrated as being of equal length. However, it should be understood that these legs may vary in length as desired. Since the leg 15c determines the depth of each half 11 and 12 for the case 10, the length of this leg can be varied to meet functional requirements and thereby vary the depth of the case. Further, one half of the case could be deeper than the other half although identical halves are preferred.

The halves 11 and 12 are hinged together by an elongated piano hinge 19 with leaves 19a and 19b respectively riveted by rivets 20 to the back legs 15a of the frame strip 15 as best shown in FIGURE 3. As shown in FIGURE 2, the hinge 19 extends for substantially the entire length of the legs 15a.

The legs 15a of the frame 13, opposite the hinged together legs, receive handles 21 at their midpoints. The handles 21 are identical and are in side-by-side relation so as to be easily grasped in one hand. Each handle 21 has end legs 22 bottomed on the sides 15c of the legs 15a and secured to this side by screws such as 23 as shown in FIGURE 3.

Clasps 24 are also provided to secure the unhinged legs 15a in abutted together relation as shown in FIGURE 1.

As shown in FIGURE 2, a plurality of transverse strips 25 of flexible rod mounting grips extend transversely across the bottom of the casing half 11 and are secured to both the panel 14 and the side legs 15a of the frame strip 15 by cement, rivets or the like. These rod mounting grips as best shown in FIGURE 3, are composed of a strip-like base 26 with rod embracing pairs of flexible arms 27 extending therefrom and coacting to define a central bore 28 of a size to tightly surround an inserted rod. The arms 27 have beveled ends 27a providing an entrance mouth 29 to the bore 28 for guiding the rod into the bore.

As shown in FIGURE 2, three strips 25 are provided and a plurality of rods 30 and rod sections 31 are carried in the strips in spaced side-by-side relation.

The grip strips 25 can be composed of molded rubber with the base 26 being fixedly anchored to the case and with the arms 27 being sufficiently resilient to readily accept but to snugly hold the rods. To insert a rod, it is only necessary to press it through the mouth 29 between the arms 27 whereupon the arms will split apart to accept the rod in the bore 28 and the arms will spring back to closed position to tightly hold the rod.

When the case is in open position as shown in FIGURE 2, the rods are fully exposed along their entire length and when the case is in the closed position of FIGURES 1 and 3, the rods are fixedly held in the case. As shown in FIGURE 3, the casing half 12 provides space below the rods which could be equipped with additional grips having the fingers staggered relative to the fingers 27 so that an additional set of rods could be mounted in the cover as desired.

In the second embodiment of the invention shown in FIGURES 5 to 9, the case 40 is in the form of a sleeve for receiving a tray 41 on which the rods are carried. The case 40, like the case 10, is composed of an extruded metal frame 42 and panels 43 carried at the side legs of the frame to enclose a rectangular space. The frame 42 is a single strip of extruded channel shaped material 44 mitered at 45 and bent into a U-shape to provide elongated side legs 44a defining the sides of the case 40 and a short end leg 44b defining the closed end of the case. The free ends of the legs 44a are beveled or mitered at 46 and the open end of the frame between the beveled edges 46 is closed by an end cap 47 preferably formed of the same channel strip material 44 forming the main frame 42.

As best shown in FIGURES 8 and 9, the channel strip 44 has a back wall or outer wall 44c, side walls 44d and 44e at right angles to the wall 44c and cooperating therewith to form a U-shaped channel. A first flange 44f extends from the end wall 44c in spaced parallel relation inwardly from the side wall 44d and cooperates with this side wall to provide a groove 48 receiving the peripheral margin portion of one panel 43. A similar flange 44g is provided adjacent the side wall 44e in spaced parallel relation to cooperate therewith and form a groove 49 which receives a peripheral margin of the other panel 43. In addition however, a third flange 44h is provided in spaced parallel relation from the flange 44g to cooperate therewith and form a second groove 50 for slidably supporting the tray 41 as more fully hereinafter described.

The channel strip 44 is therefore a full U-shaped channel with a single flange in spaced parallel relation inwardly from one side wall to define a first inwardly opening groove, a second flange extending in spaced parallel relation closely adjacent the other side wall to form a similar groove at the opposite leg of the channel and a third flange between the flanges which are adjacent the side legs for cooperating with one of these flanges to define a third groove. The first two grooves support the closure panels 43 for the case while the third groove slidably supports the tray that is received in the case.

Rivets 51 extend through the side legs 44d and 44e, the adjacent flanges 44f and 44g and the marginal portions of the panels 43 to fixedly secure the panels in the grooves 48 and 49.

The tray 41 is composed of a sheet 52 of rigid material such as plastic, plywood or metal and may be somewhat thicker than the panels 43 as shown to resist warping even though unsupported. The panel 52 is sized to have a sliding fit in the grooves 50 and to span the width of the sleeve encompassed by the case 40. The panel also is sufficiently long to extend along the entire length of the case with one end bottomed in the groove 50 provided by the end leg 44b of the frame strip 44 and with the other end closely adjacent the open end of the frame.

The panel 52 has mounted thereon a plurality of strips 53 of rod gripping members. Each strip 53 is composed of a bottom or main body portion 54 which is cemented or otherwise secured to the inside face of the panel carried in the channel groove 49 to span the entire space between the flanges 44h of the strip. The base or main body 54 carries a plurality of pairs of rod gripping arms 55 which cooperate to define bores 56 for snugly receiving rods. Each arm 55 terminates in a beveled end 55a to cooperate and provide an entrance mouth 57 to the bore 56. Thus when a rod is pressed through the mouth 57, the arms will spread apart to open up the bore for receiving the rod, and when the rod is seated in the bore, the arms will spring together to tightly hug the rod.

As shown in FIGURE 6, the tray 41 carries a rod 58 with two extensions 59 and 60 and all three sections of the rod are carried in the bores of the gripping arms in fixed spaced relation so that they cannot contact each other.

The tray 41 as shown in FIGURE 6 slides through the open end of the case 40 and when it is bottomed on the leg 44b of the casing frame, it will be completely enclosed by the sleeve provided by the casing. The end cap 47 is then positioned between the beveled ends 46 of the casing frame and since it has the same channels as the frame, the grooves of these channels will also receive the tray and the panels 43 in the same manner as the main channel strip 44 forming the frame 42. To hold the cap 47 in closed position, the ends of the panels 43 underlying the cap are provided with holes or recesses 61 to cooperate with depressions or dimples 62 in the side legs of the cap 47 so that the cap is snapped onto the end edges of the panels to be fixedly held in closed position.

One side leg 44a of the frame 42 carries a handle 63 at the midpoint thereof to facilitate carrying the case.

It will therefore be understood that in the embodiment of FIGURES 1 to 4, the case of this invention is formed in two hinged together halves with one or both of the halves carrying the rod gripping supports while in the embodiment of FIGURES 5 and 9, the case is in the form of a sleeve slidably receiving a tray provided with the rod gripping means. In the first embodiment, the frame of the case is composed of extruded metal or plastic angle strips having a groove defining frame adjacent one side of the angle to receive the sheet material which forms the enclosure. In the second embodiment, the frame is formed from extruded metal or plastic channel strips having first and second flanges adjacent both side legs to provide grooves for receiving the sheet in panels for forming the enclosure plus an additional flange to define a third groove for forming a track to slidably support the tray.

I claim as my invention:

1. A carrying case for elongated rods and the like which comprises
   an elongated body member having a frame composed of side and end strip portions formed with inwardly facing channels along the lengths thereof,
   sheet material panels having marginal portions seated in said channels and cooperating with the frame to form an elongated enclosure,
   means for mounting rods fixedly in said enclosure comprising rod embracing resilient gripping members positioned to hold individual rods in fixed spaced relation in the enclosure,
   said enclosure having open and closed positions,
   a handle on said enclosure secured to said frame,
   means for securing the enclosure in closed position, and
   means coacting with said securing means for providing an access to said enclosure.

2. The case of claim 1 wherein the body member is in the form of two hinged together sections opening and closing along their length and at least one of said sections has the rod mounting means fixed thereon.

3. The case of claim 1 wherein the body member is in the form of a sleeve with an open end closed by a cap and the rod mounting means are carried by a tray slidable into the sleeve.

4. A carrying case for elongated rods and the like which comprises:
   two elongated body members each having a frame composed of a single extruded strip having an inwardly facing channel along the length thereof and forming side and end portions of said elongated body members,
   rigid sheet material panels having marginal portions seated in said channels and cooperating with the frames to form said two elongated body members,
   means for securing together said two body members to form said case,
   means for mounting rods fixedly within said case comprising rod embracing resilient gripping members positioned to hold individual rods in fixed spaced relation within the case,
   said case having open and closed positions,
   handle means on said case secured to said frames,
   means for locking the case in closed position, and
   means coacting with said locking means for providing access to said case.

5. The case of claim 2 wherein the two elongated body members are hinged together along the lengths thereof, and open along their entire length to provide full access to the interior of the case.

6. A carrying case for elongated rods and the like which comprises:
   an elongated rectangular sleeve having a frame,
   said frame being composed of a channel strip formed to provide three sides of the sleeve,
   said channel strip having inwardly opening grooves along the side legs of the channel,
   sheet material panels having marginal portions seated in said grooves,
   securing means locking said panels in said grooves,
   said channel strip having an additional inwardly opening groove inwardly from and adjacent to one of said first mentioned grooves,
   a tray slidably mounted in said sleeve in said additional groove,
   rod gripping means mounted on said tray,
   an end cap for closing said sleeve, and
   means for detachably securing the end cap to the sleeve.

7. The carrying case of claim 6 wherein the end cap is composed of a channel strip with the same grooves as the frame for the sleeve to receive the panels and tray and wherein means detachably lock the end cap to the case.

References Cited
UNITED STATES PATENTS

| | | | |
|---|---|---|---|
| 2,519,662 | 8/1950 | Kempken | 206—16 |
| 2,595,230 | 5/1952 | Daviau | 43—26 |
| 2,816,390 | 12/1957 | Vaughn et al. | 43—26 |
| 3,088,583 | 5/1963 | Holtz | 206—65 X |

CASMIR A. NUNBERG, *Primary Examiner.*